US012674674B2

(12) United States Patent
Kawashima

(10) Patent No.: US 12,674,674 B2
(45) Date of Patent: Jul. 7, 2026

(54) PATH PLANNING APPARATUS AND PATH PLAN CORRECTION METHOD OF PATH PLANNING APPARATUS

(71) Applicant: TOYOTA JIDOSHA KABUSHIKI KAISHA, Toyota (JP)

(72) Inventor: Wataru Kawashima, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 18/672,566

(22) Filed: May 23, 2024

(65) Prior Publication Data

US 2024/0401964 A1      Dec. 5, 2024

(30) Foreign Application Priority Data

Jun. 1, 2023      (JP) ................................. 2023-090903

(51) Int. Cl.
*G01C 21/36*          (2006.01)
*G06V 20/56*          (2022.01)

(52) U.S. Cl.
CPC ....... *G01C 21/3602* (2013.01); *G06V 20/588* (2022.01)

(58) Field of Classification Search
CPC .............. G01C 21/3602; G01C 21/343; G01C 21/3446; G01C 21/387; G06V 20/588; G06V 10/82; G06V 10/751; G01S 19/42; G06N 3/044; G06N 3/0464; G06N 3/09
See application file for complete search history.

(56) References Cited

U.S. PATENT DOCUMENTS

| | | | | |
|---|---|---|---|---|
| 2013/0173232 A1* | 7/2013 | Meis | ...................... | G08G 1/167 703/2 |
| 2014/0118552 A1* | 5/2014 | Takahama | ........... | B60W 40/072 348/148 |
| 2015/0310283 A1* | 10/2015 | Mori | ..................... | B60W 30/12 382/104 |

(Continued)

FOREIGN PATENT DOCUMENTS

| | | | |
|---|---|---|---|
| CN | 114283398 A | * | 4/2022 |
| JP | 2017-054296 A | | 3/2017 |

(Continued)

OTHER PUBLICATIONS

Machine Translation: WO-2021224245-A1 (Year: 2021).*
Machine Translation: KR-20220002087-A (Year: 2022).*
Machine Translation: CN-114283398-A (Year: 2022).*

*Primary Examiner* — Anne Marie Antonucci
*Assistant Examiner* — Connor L Knight
(74) *Attorney, Agent, or Firm* — Dinsmore & Shohl LLP

(57)          ABSTRACT

The path planning apparatus according to an aspect of the present disclosure generates a path plan of a host vehicle using a first deep learning model from a captured image of a vehicle-mounted camera. The path planning apparatus recognizes left and right lane lines forming a travelling lane of a host vehicle from an image captured by a vehicle-mounted camera, and corrects a path plan using a recognition result of the lane lines. The path planning apparatus determines whether the left and right lane lines satisfy a preset parallel condition. The path planning apparatus does not correct the path plan using the recognition result of the lane lines, when the left and right lane lines are determined as not satisfying the parallel condition.

7 Claims, 4 Drawing Sheets

(56)  References Cited

U.S. PATENT DOCUMENTS

| 2018/0204074 | A1 |   | 7/2018  | Kumano et al. |
|---|---|---|---|---|
| 2019/0303688 | A1 | * | 10/2019 | Yang ................... G06F 18/2413 |
| 2020/0189582 | A1 |   | 6/2020  | Fukushige et al. |
| 2021/0024065 | A1 |   | 1/2021  | Mizoguchi |
| 2021/0402992 | A1 |   | 12/2021 | Morimoto et al. |
| 2023/0159050 | A1 | * | 5/2023  | Hershkovich .......... G06V 20/58 |
|  |  |  |  | 701/26 |

FOREIGN PATENT DOCUMENTS

| JP | 2018-116370 | A |   | 7/2018  |   |
|---|---|---|---|---|---|
| JP | 2019-191741 | A |   | 10/2019 |   |
| JP | 2021-020475 | A |   | 2/2021  |   |
| JP | 2022-011887 | A |   | 1/2022  |   |
| JP | 2022-059938 | A |   | 4/2022  |   |
| JP | 2022-113644 | A |   | 8/2022  |   |
| KR | 20220002087 | A | * | 1/2022  | .............. G06N 3/08 |
| WO | 2019/043832 | A1 |  | 3/2019  |   |
| WO | WO-2021224245 | A1 | * | 11/2021 | ............ B60W 30/12 |

* cited by examiner

PATH PLANNING APPARATUS AND PATH PLAN CORRECTION METHOD OF PATH PLANNING APPARATUS

CROSS-REFERENCE TO RELATED APPLICATIONS

This application is based upon and claims the benefit of priority from Japanese Patent Application No. 2023-090903, filed on Jun. 1, 2023, the entire contents of which are incorporated herein by reference.

TECHNICAL FIELD

The present disclosure relates to a path planning apparatus and a path plan correction method of the path planning apparatus.

BACKGROUND

Japanese Patent Application Laid-Open No. 2018-116370 is known as a technical document related to path planning for vehicles. This publication discloses a technique for recognizing lane lines of a running road of a vehicle from an image captured by a vehicle-mounted camera.

SUMMARY

Generating a path plan for a vehicle using the results of lane line recognition by the vehicle's camera has been considered. However, at locations where the relationship between the left and right lane lines changes, corrections based on the results of lane line recognition may lead to decreased accuracy in path planning. Such locations include branch roads, intersections, and areas where the number of lanes increases or decreases.

A path planning apparatus according to an aspect of the present disclosure generates a path plan of a host vehicle using a first deep learning model from a captured image of a vehicle-mounted camera. The path planning apparatus recognizes left and right lane lines forming a travelling lane of a host vehicle from an image captured by a vehicle-mounted camera, and corrects a path plan using a recognition result of the lane lines. The path planning apparatus determines whether the left and right lane lines satisfy a preset parallel condition. The path planning apparatus does not correct the path plan using the recognition result of the lane lines, when the left and right lane lines are determined as not satisfying the parallel condition.

According to the path planning apparatus according to the aspect of the present disclosure, when the left and right lane lines do not satisfy the parallel condition, the path plan is not corrected using the recognition result of the lane lines. Accordingly, it is possible to suppress a decrease in accuracy of path planning due to correction.

In the path planning apparatus according to the aspect of the present disclosure, the left and right lane lines are recognized using a second deep learning model from an image captured by the vehicle-mounted camera, and the second deep learning model is different from the first deep learning model.

According to this path planning apparatus, left and right lane lines are recognized from an image captured by a vehicle-mounted camera using a second deep learning model different from a first deep learning model. As a result, even if there is a path plan generation error caused by the first deep learning model, the error is corrected by the left and right lane lines recognized by using the second deep learning model, and thus it is possible to suppress a decrease in the accuracy of the path plan.

In the path planning apparatus, it is determined that the left and right lane lines do not satisfy the parallel condition when an angle formed by the left and right lane lines is greater than or equal to an allowable angle threshold, when the travelling lane is a straight line.

According to this path planning apparatus, since the angle formed by the left and right lane lines increases at a location where the relationship between the left and right lane lines changes, it is determined that the left and right lane lines do not satisfy the parallel condition when the angle formed by the left and right lane lines is equal to or greater than the allowable angle threshold. Accordingly, it is possible to suppress a decrease in accuracy of path planning due to correction using the recognition result of the lane lines.

In the path planning apparatus, a lane width of the travelling lane is calculated based on the recognition result of the lane lines whenever the recognition result of the lane lines is updated, a lane width difference that is a difference between the lane width before the update and the lane width after the update is calculated, and the left and right lane lines are determined as not satisfying the parallel condition when the lane width difference is greater than or equal to an allowable difference threshold.

According to this path planning apparatus, since the lane width difference between the lane width before the update and the lane width after the update becomes large at a location where the relationship between the left and right lane lines changes, it is determined that the left and right lane lines do not satisfy the parallel condition when the lane width difference is equal to or greater than the allowable difference threshold. Accordingly, it is possible to suppress a decrease in accuracy of path planning due to correction using the recognition result of the lane lines.

Another aspect of the present disclosure is a path plan correction method of a path planning apparatus that generates a path plan of a host vehicle using a first deep learning model from a captured image of a vehicle-mounted camera. In the path plan correction method, left and right lane lines forming a travelling lane of a host vehicle are recognized from an image captured by a vehicle-mounted camera. In the path plan correction method, it is determined whether or not the left and right lane lines satisfy a preset parallel condition. In the path plan correction method, the path plan is not correct the path plan using the recognition result of the lane lines, when the left and right lane lines are determined as not satisfying the parallel condition.

According to a path plan correction method of a path planning apparatus according to another aspect of the present disclosure, when the left and right lane lines do not satisfy the parallel condition, the path plan is not corrected using the recognition result of the lane lines. Accordingly, it is possible to suppress a decrease in accuracy of path planning due to correction.

According to each aspect of the present disclosure, it is possible to suppress a decrease in accuracy of a path plan due to correction of the path plan using a recognition result of lane lines.

DETAILED DESCRIPTION

Hereinafter, embodiments of the present disclosure will be described with reference to the drawings.

Figure 1:
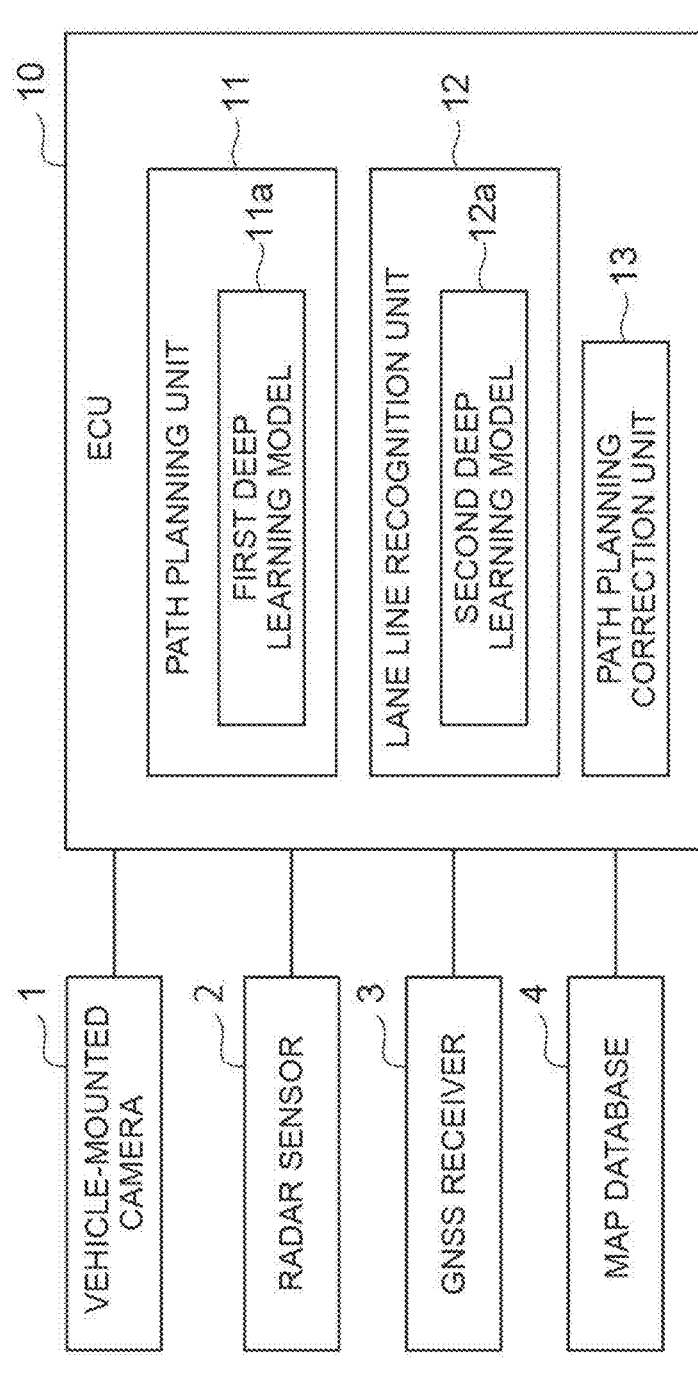
FIG. 1 is a block diagram illustrating a path planning apparatus according to a present embodiment.

FIG. 1 is a block diagram illustrating a path planning apparatus 100 according to a present embodiment. The path planning apparatus 100 illustrated in FIG. 1 is an apparatus that generates a path plan of a host vehicle based on a captured image of a vehicle-mounted camera 1. The path planning apparatus 100 may be mounted on a host vehicle, and some of the functions may be executed by servers capable of communicating with the host vehicle. The path planning apparatus 100 outputs the generated path plan to an autonomous driving apparatus, a driving support apparatus, or the like. The path planning apparatus 100 may be part of an autonomous driving apparatus or a driving assistance apparatus.

The path plan is a plan related to a path in which the host vehicle travels. The path plan is used in autonomous driving or driving support of a host vehicle, for example. The path plan may be a continuous coordinate data on a map. The path plan may be a data including a target lateral position (a position of the control target in a widthwise direction of the travelling lane) with respect to a target longitudinal position (a position of the control target in an extending direction of the travelling lane) of the travelling lane. The path plan may be a data including a target steering angle with respect to a target longitudinal position of a travelling lane. The path plan may be a time-series data of a target lateral position with respect to the lane or a time-series data of a target steering angle. Instead of the target steering angle, a target steering torque may be used.

Configuration of Path Planning Apparatus

Hereinafter, the configuration of the path planning apparatus 100 according to the present embodiment will be described. As illustrated in FIG. 1, the path planning apparatus 100 is provided with an electronic control unit (ECU) 10 manages the apparatus. The ECU 10 is an electronic control unit including a central processing unit (CPU) and a storage unit such as a read only memory (ROM) or a random-access memory (RAM). In the ECU 10, for example, various functions are realized by executing a program stored in the storage unit by the CPU. The ECU 10 may be composed of a plurality of electronic units.

ECU 10 is connected to the vehicle-mounted camera 1, a radar sensor 2, a GNSS receiver 3, and a map database 4.

The vehicle-mounted camera 1 is an imaging device that images an external situation of the host vehicle. The vehicle-mounted camera 1 is provided on the back side of the windshield of the host vehicle, for example, and images the front of the host vehicle. The vehicle-mounted camera 1 may be configured to include a plurality of cameras that capture images of the rear and the sides of the car. The vehicle-mounted camera 1 transmits a captured image outside the host vehicle to the ECU 10.

The radar sensor 2 is a detection device that detects an object around the host vehicle using radio waves (for example, millimeter waves) or light. In the radar sensor 2, for example, millimeter wave radar or LIDAR (Light Detection and Ranging) is included. The radar sensor 2 detects an object by transmitting radio waves or light to the surroundings of the host vehicle and receiving radio waves or light reflected by the object. The radar sensor 2 transmits object detection information regarding object detection to the ECU 10. The object may include lane lines of a road.

The GNSS receiver 3 measures the position of the host vehicle (for example, the latitude and longitude of the host vehicle) by receiving signals from positioning satellites. The GNSS receiver 3 transmits the measured position information of the host vehicle to the ECU 10.

The map database 4 is a data base that stores map information. The map database 4 is, for example, formed in a storage device such as a hard disk drive (HDD) mounted on the host vehicle. It is formed in a storage device such as the like. The map information includes position information of roads, information of road shapes (for example, types of curves and straight lines, curvatures of curves, and the like), information of lane widths, position information of intersections and branch points, position information of structures, and the like. The map database 4 may be formed in a sever capable of communicating with the host vehicle.

Next, the functional configuration of the ECU 10 will be described. As illustrated in FIG. 1, ECU 10 has a path planning unit 11, a lane line recognition unit 12, and a path planning correction unit 13. Note that some of the functions of the ECU 10 described below may be executed by servers capable of communicating with the host vehicle.

The path planning unit 11 generates a path plan of the host vehicle based on the captured image of the vehicle-mounted camera 1. The path planning unit 11 may use the object detection information of the radar sensor 2 in addition to the captured image of the vehicle-mounted camera 1 to generate the path plan. The path planning unit 11 may use the position information of the host vehicle measured by the GNSS receiver 3 and the map information of the map database 4 to generate the path plan.

The path planning unit 11 generates a path plan by using a first deep learning model 11a. The first deep learning model 11a is a machine learning model in which learning by deep learning is performed so as to output a path plan from a captured image of the vehicle-mounted camera 1, for example. The neural network constituting the first deep learning model 11a is, for example, a convolutional neural network including a plurality of layers including a plurality of convolutional layers and a pooling layer. The neural network may also be configured as a recurrent neural network (RNN).

Note that pre-processing may be performed on the captured image serving as an input of the first deep learning model 11a. The pre-processing includes, for example, data normalization, data imputation, noise removal, and the like. The preprocessing may include a process of extracting a feature amount from the captured image. The feature set includes, for example, at least one of lane lines, a lane width, a curvature of the lane, an obstacle included in the captured image, a road sign, a road surface display, and a lighting state of traffic light. The obstacle includes at least one of moving objects such as another vehicle and a stationary object such as a guardrail, a wall, a utility pole, and a parked vehicle. The path planning unit 11 may input the feature amount to the first deep learning model 11a together with the captured image.

The path planning unit 11 inputs the captured image of the vehicle-mounted camera 1 to the first deep learning model 11a. Thus, the path planning unit 11 acquires the path plan output from the first deep learning model 11a. The path planning unit 11 may input time-series data of captured images in a certain period of time. The path planning unit 11 may additionally input the radar sensor 2 object detection information or map information around the host vehicle to the first deep learning model 11*a*. The map information of the surroundings of the host vehicle may be map information related to a traveling road of the host vehicle.

The lane line recognition unit 12 recognizes left and right lane lines forming a travelling lane of the host vehicle based on the captured image of the vehicle-mounted camera 1. The lane line recognition unit 12 performs lane line recognition independently of the path planning unit 11. In detail, the lane line recognition unit 12 performs lane line recognition using a second deep learning model 12*a*.

The second deep learning model 12*a* is a machine learning model in which learning by deep learning is performed so as to output a recognition result of lane lines from a captured image of the vehicle-mounted camera 1. The neural network constituting the second deep learning model 12*a* may be a convolutional neural network or a recurrent neural network. The neural network constituting the second deep learning model 12*a* may be of the same type as the first deep learning model 11*a*, or may be of a different type from the first deep learning model 11*a*.

The lane line recognition unit 12 acquires the recognition result of the lane lines output from the second deep learning model 12*a* by inputting the captured image of the vehicle-mounted camera 1 to the second deep learning model 12*a*. The lane line recognition unit 12 may input time-series data of captured images in a certain period of time. The lane line recognition unit 12 may additionally input the radar sensor 2 object detection information into the second deep learning model 12*a*. The lane line recognition unit 12 may be a mode in which only information that has passed through a filter for extracting a feature related to lane lines among object detection information of the radar sensor 2 is additionally input.

The lane line recognition unit 12 does not necessarily need to use the second deep learning model 12*a* for lane line recognition. The lane line recognition unit 12 may recognize the lane lines of the travelling lane by the lane line recognition algorithm using the gradient of the brightness in the captured image. The lane line recognition unit 12 may recognize the lane lines of the travelling lane by a known image processing method. In this case, the lane line recognition unit 12 may have no the second deep learning model 12*a*. Known image processing methods include at least one of an edge detection algorithm, a filter smoothing process, color space conversion, binarization, hough transform, pattern matching, and the like.

The path planning correction unit 13 corrects the path plan generated by the path planning unit 11 using the recognition result of the lane lines by the lane line recognition unit 12. For example, when the distances in the lane width direction between the paths of the vehicles in the path plan and the left and right lane lines in the path plan are equal to or greater than a predetermined value, the path planning correction unit 13 corrects the path plan so that the paths of the vehicles approach the center position. The path plan correction method is not limited to the above description, and a known correction method can be adopted.

The path planning correction unit 13 determines whether the left and right lane lines of the travelling lane recognized by the lane line recognition unit 12 satisfy the parallel condition. The parallel condition is a condition set in advance to determine whether the left and right lane lines have a substantially parallel relationship. When the left and right lane lines do not satisfy the parallel condition, the path planning correction unit 13 does not correct the path plan using the recognition result of the lane lines by the lane line recognition unit 12. When the left and right lane lines satisfy the parallel condition, the path planning correction unit 13 corrects the path plan using the recognition result of the lane lines. The path planning correction unit 13 determines the parallel condition of the lane lines at regular intervals in the extending direction of the travelling lane, for example. The longitudinal direction of the vehicle may be used in place of the extending direction of the travelling lane.

In detail, when the travelling lane of the host vehicle is a straight line and an angle formed by left and right lane lines recognized by the lane line recognition unit 12 is equal to or greater than an allowable angle threshold, the path planning correction unit 13 determines that the left and right lane lines do not satisfy the parallel condition. The allowable angle threshold is a threshold set to determine the parallel condition of the lane lines. The allowable angle threshold can be set at 5°, 3°, or even as low as 1°. The allowable angle threshold can be set to a value larger than the error amount of the angle calculation attributable to the recognition accuracy of the lane lines in the lane line recognition unit 12.

The path planning correction unit 13 determines whether or not the travelling lane of the host vehicle is a straight line based on, for example, the position information of the host vehicle measured by the GNSS receiver 3 and the map information of the map database 4. The path planning correction unit 13 may determine whether the travelling lane of the host vehicle is a straight line from curvatures of paths in the path plan generated by the path planning unit 11. The path planning correction unit 13 may determine whether the travelling lane of the host vehicle is a straight line from a mean value of curvatures of left and right lane lines recognized by the lane line recognition unit 12.

When determining that the travelling lane of the host vehicle is a straight line, the path planning correction unit 13 calculates an angle formed by the left and right lane lines. The path planning correction unit 13 recognizes the extending direction of each of the left and right lane lines at a constant interval by a known image processing method based on the recognition result of the lane lines by the lane line recognition unit 12. The path planning correction unit 13 calculates an angle when each lane lines is extended and crossed as an angle of the left and right lane lines. When the angle formed by the left and right lane lines is equal to or greater than the allowable angle threshold, the path planning correction unit 13 determines that the left and right lane lines do not satisfy the parallel condition.

Further, the path planning correction unit 13 can determine the parallel condition using the lane width. Each time the recognition result of the lane lines is updated due to the lane line recognition unit 12, the path planning correction unit 13 calculates the lane width of the travelling lane based on the recognition result of the lane lines. The lane width corresponds to an interval between left and right lane lines in the width direction of the travelling lane. Note that the width direction of the vehicle may be used instead of the width direction of the travelling lane.

The path planning correction unit 13 calculates a lane width difference between the lane width before the update and the lane width after the update. The lane width difference is an absolute value. The lane width difference may be an index that increases in accordance with an increase in the lane width after the update relative to the lane width before the update. When the lane width difference is equal to or greater than the allowable difference threshold, the path planning correction unit 13 determines that the lane lines on the left and right sides of the travelling lane do not satisfy the parallel condition. The allowable difference threshold is a threshold set to determine the parallel condition of the lane lines. The allowable difference threshold can be set to a value larger than the error amount of the lane width difference caused by the recognition accuracy of the lane lines in the lane line recognition unit 12. When the left and right lane lines do not satisfy the parallel condition, the path planning correction unit 13 does not correct the path plan using the recognition result of the lane lines.

Figure 2:
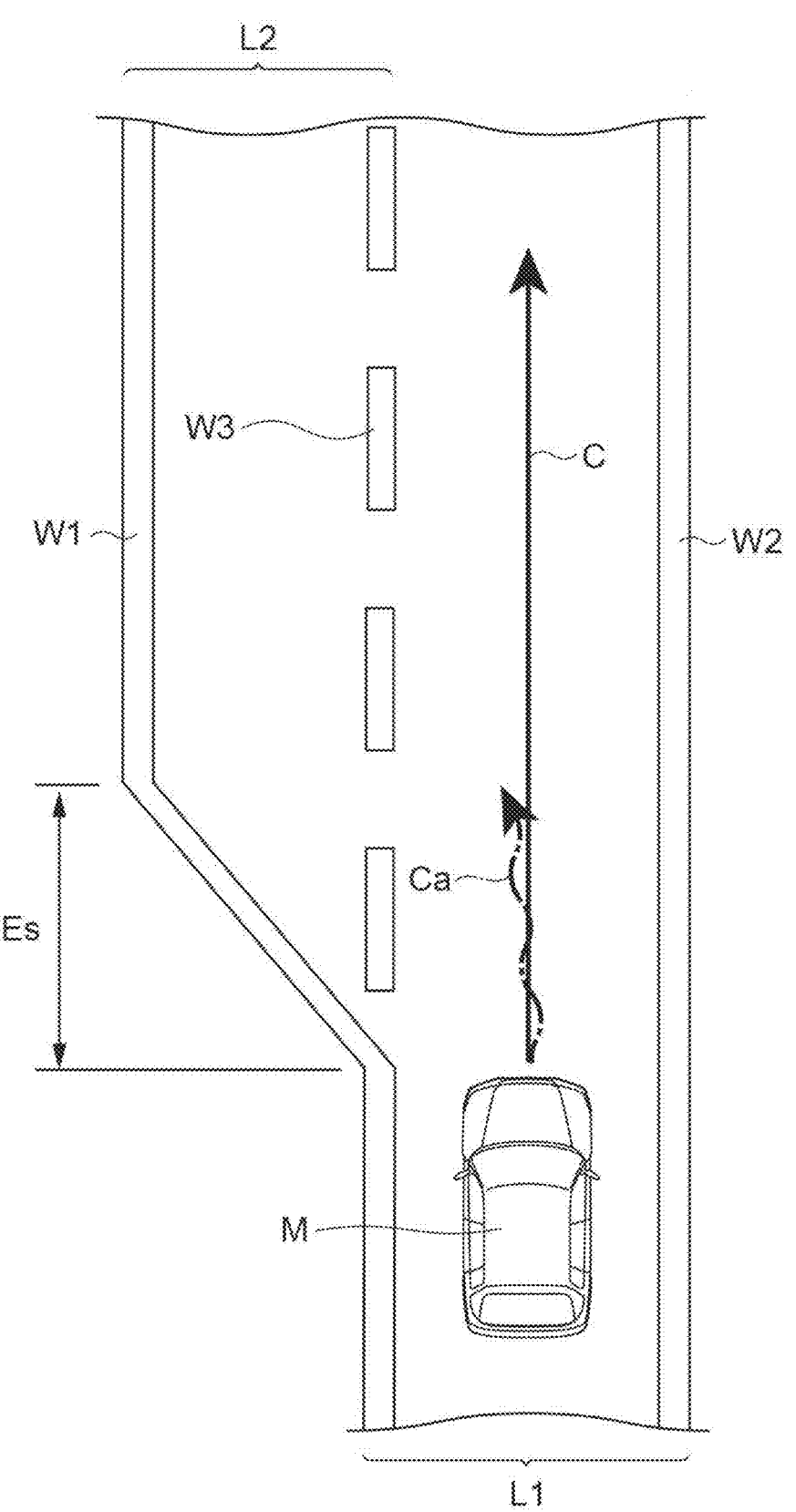
FIG. 2 is a plan view illustrating a situation in which the left and right lane lines do not satisfy the parallel condition.

Here, FIG. 2 is a plan view illustrating a situation in which the left and right lane lines do not satisfy the parallel condition. FIG. 2 shows a situation where a host vehicle enters a branch point of a road. FIG. 2 shows a path C, a travelling lane L1, a branch lane L2, and lane line W1 to W3. The path C is a path of the path plan. The path C in the path plan is the path corresponding to the path plan generated by the path planning unit 11. The travelling lane L1 is a lane in which the host vehicle M are traveling. The branch lane L2 is a lane branching off from the travelling lane L1 and heading in a direction different from the travelling lane L1.

A lane line W1 shown in FIG. 2 forms lane lines on the left side of the travelling lane L1 until branching. The lane line W1 is the lane line on the left side of the branch lane L2 after branching. A range in which the lane line W1 is inclined with respect to the extending direction of the travelling lane L1 and the branch lane L2 is formed is shown as a branch range Es. A lane line W2 is the lane line on the right side of the travelling lane L1. A lane line W3 is the dashed line separating the travelling lane L1 and the branch lane L2.

In the situation shown in FIG. 2, the parallel condition of the lane line W1 and the lane line W2 is not satisfied in the branch range Es. Therefore, the path planning correction unit 13 does not correct the path plan based on the recognition results of the lane line W1 and the lane line W2 by the lane line recognition unit 12. In the branch range Es, the lane line W1 extends in an oblique direction with respect to the travelling lane L1. Accordingly, since the angle formed by the lane line W1 and the lane line W2 is equal to or greater than the allowable angle threshold, the parallel condition is not satisfied. In the branch range Es, the lane line W1 is inclined in a direction away from the lane line W2. The lane width difference between the lane line W1 and the lane line W2 is also greater than or equal to the allowable difference threshold. For this reason, if the path plan is corrected using the lane line recognition result of the branch range Es, there is a possibility that the correction becomes inappropriate. Improper correction is indicated as an arrow Ca.

If the parallel condition of the lane line W1 and the lane line W2 is not satisfied, the path planning correction unit 13 does not correct the path plan using the recognition result of the lane line W1 and the lane line W2 in the lane line recognition unit 12. This makes it possible to avoid making an inappropriate correction to the path plan. Whether the path planning correction unit 13 corrects the path plan or not, the path plan is output to an autonomous driving apparatus, a driving support apparatus, or the like.

Path Plan Correction Method of the Path Planning Apparatus

Figure 3:
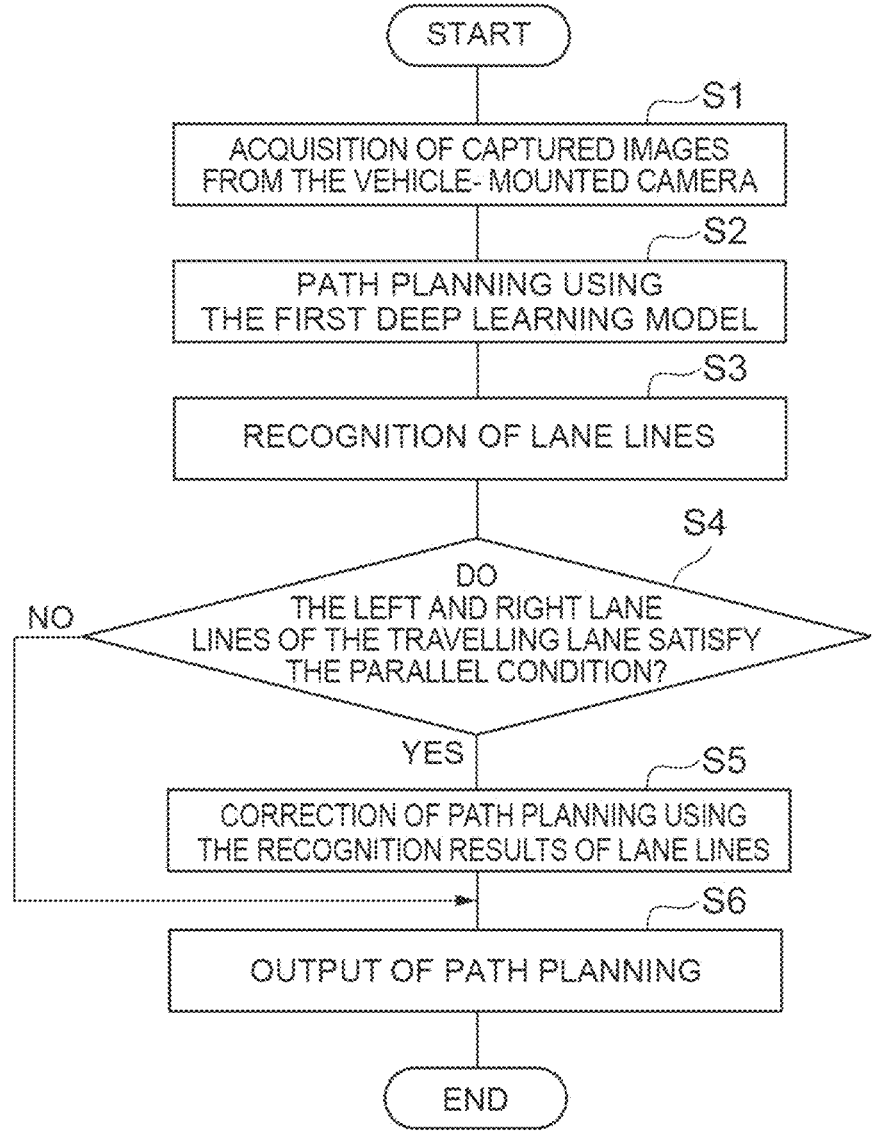
FIG. 3 is a flowchart illustrating an example of a path plan correction method of a path planning apparatus.

Next, the path plan correction method of the path planning apparatus 100 according to the present embodiment will be described with reference to the drawings. FIG. 3 is a flowchart illustrating an example of the path planning apparatus 100 plan correction method. The path plan correction method is executed, for example, when driving support control or autonomous driving control is performed.

As illustrated in FIG. 3, the ECU 10 of the path planning apparatus 100 acquires the captured image of the vehicle-mounted camera 1 in S1. The ECU 10 acquires an image of the outside of the car including the front of the host vehicle M captured by the vehicle-mounted camera 1. Thereafter, the ECU 10 transitions to S2.

In S2, ECU 10 generates a path plan using the first deep learning model 11a by the path planning unit 11. The path planning unit 11 generates a path plan by inputting the captured image of the vehicle-mounted camera 1 to the first deep learning model 11a. Thereafter, the ECU 10 transitions to S3.

In S3, ECU 10 performs lane line recognition using the second deep learning model 12a by the lane line recognition unit 12. The lane line recognition unit 12 recognizes the left and right lane lines of the travelling lane by inputting the captured image of the vehicle-mounted camera 1 to the second deep learning model 12a. The lane line recognition unit 12 does not necessarily need to use the second deep learning model 12a for lane line recognition. Thereafter, the ECU 10 transitions to S4.

In S4, the ECU 10 determines whether the left and right lane lines of the travelling lane satisfy the parallel condition according to the path planning correction unit 13. The flow of determining the parallel condition will be described in detail later. If it is determined that the left and right lane lines of the travelling lane satisfy the parallel condition (YES in S4), the ECU 10 transitions to S5. If it is not determined that the left and right lane lines of the travelling lane satisfy the parallel condition (NO in S4), the ECU 10 transitions to S6.

In S5, the ECU 10 corrects the path plan generated by the path planning unit 11 using the recognition result of the lane lines by the lane line recognition unit 12. The correction method is not particularly limited. Thereafter, the ECU 10 transitions to S6.

In S6, the ECU 10 outputs the path plan to an autonomous driving apparatus, a driving support apparatus, or the like. Thereafter, the ECU 10 completes the path plan correction method. Note that S2 and S3 in FIG. 3 may be performed in reverse order or simultaneously.

Figures 4A, 4B:
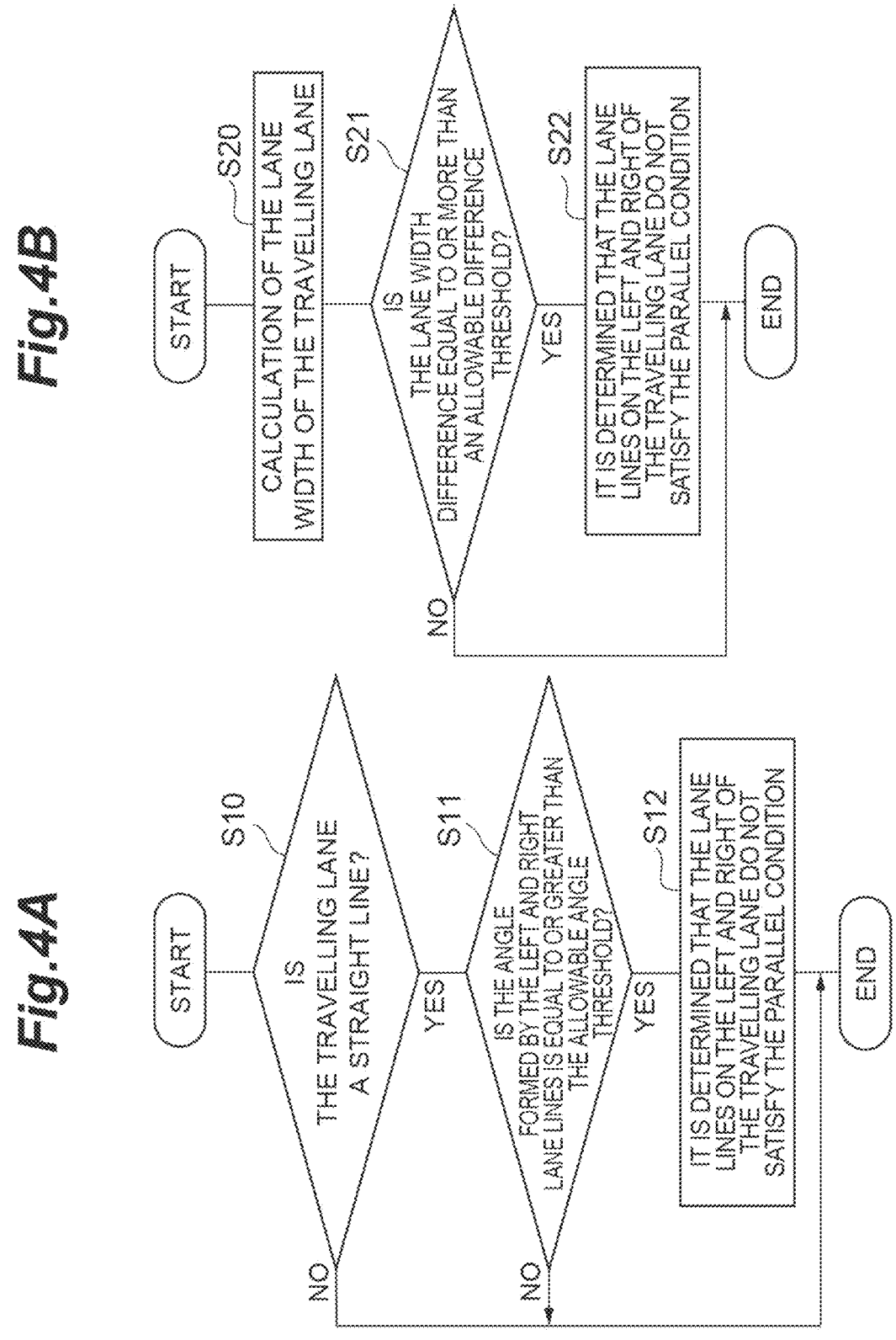
FIG. 4A is a flowchart illustrating an example of parallel condition determination processing.
FIG. 4B is a flowchart illustrating another example of the parallel condition determination processing.

FIG. 4A is a flowchart illustrating an example of parallel condition determination processing. The parallel condition determination processing corresponds to S4 of the flowchart of FIG. 3.

As illustrated in FIG. 4A, ECU 10 determines whether the travelling lane of the host vehicle is a straight line by the path planning correction unit 13 in S10. The path planning correction unit 13 determines whether or not travelling lane of the host vehicle is a straight line based on, for example, the position information of the host vehicle measured by the GNSS receiver 3 and the map information of the map database 4. If the ECU 10 determines that the travelling lane is a straight line (YES in S10), the ECU 10 transitions to S11. If the ECU 10 does not determine that the travelling lane is a straight line (NO in S10), the parallel condition determination processing is terminated.

In S11, the ECU 10 determines whether the angle formed by the left and right lane lines is equal to or greater than an allowable angle threshold using the path planning correction unit 13. If it is determined that the angle formed by the left and right lane lines is equal to or greater than the allowable angle threshold (YES in S11), ECU 10 transitions to S12. If the ECU 10 does not determine that the angle formed by the left and right lane lines is equal to or greater than the allowable angle threshold (NO in S11), the parallel condition determination processing ends.

In S12, ECU 10 determines that the lane lines on the left and right of the travelling lane do not satisfy the parallel condition due to the path planning correction unit 13. Thereafter, the ECU 10 ends the parallel condition determination processing.

FIG. 4B is a flowchart illustrating another example of the parallel condition determination processing. As illustrated in FIG. 4B of the figure, ECU 10 calculates the lane width of a travelling lane by the path planning correction unit 13 in S20. The calculation of the lane width of the travelling lane may be performed whenever the recognition result of the lane lines is updated by the parallel condition determination processing due to the lane line recognition unit 12. Thereafter, the ECU 10 transitions to S21.

In S21, it is determined whether a lane width difference between a lane width before update and a lane width after update is equal to or more than an allowable difference threshold by the path planning correction unit 13. If the ECU 10 determines that the lane width difference between the lane widths before and after the update is equal to or greater than the allowable difference threshold (YES in S21), the ECU 10 transitions to S22. If the ECU 10 does not determine that the lane width difference between the lane widths before and after the update is equal to or greater than the allowable difference threshold (NO in S21), the parallel condition determination processing ends.

In S22, ECU 10 determines that the lane lines on the left and right of the travelling lane do not satisfy the parallel condition due to the path planning correction unit 13. Thereafter, the ECU 10 ends the parallel condition determination processing.

If it is determined that the parallel condition is satisfied in any parallel condition determination processing, the ECU 10 determines that the lane lines on the left and right of the travelling lane satisfy the parallel condition. Both of the parallel condition determination processing shown in FIG. 4A and FIG. 4B may be executed, or only one of them may be executed. The parallel condition determination processing may be performed by other methods.

According to the path planning apparatus 100 of the present embodiment described above, when the left and right lane lines do not satisfy the parallel condition, the path plan is not corrected using the recognition result of the lane lines. Accordingly, it is possible to suppress a decrease in accuracy of path planning due to correction. This is because the accuracy of the path plan may be reduced by correcting the path plan using the recognition result of the lane lines in a place where the relationship between the left and right lane lines changes, such as a branch road, an intersection, or a place where the number of lanes increases or decreases.

In the path planning apparatus 100, left and right lane lines are recognized from the captured image of the vehicle-mounted camera using a second deep learning model different from the first deep learning model. Accordingly, even if there is a path plan generation error caused by the first deep learning model, it is possible to suppress a decrease in the accuracy of the path plan by performing correction using the left and right lane lines recognized by using the second deep learning model.

In addition, in the path planning apparatus 100, since the angle formed by the left and right lane lines increases at a place where the relationship between the left and right lane lines changes, when the angle formed by the left and right lane lines is equal to or greater than the allowable angle threshold, it is determined that the left and right lane lines do not satisfy the parallel condition. Accordingly, it is possible to suppress a decrease in accuracy of path planning due to correction using the recognition result of the lane lines.

Alternatively, in the path planning apparatus 100, since the lane width difference between the lane width before the update and the lane width after the update becomes large at a place where the relationship between the left and right lane lines changes, it is determined that the left and right lane lines do not satisfy the parallel condition when the lane width difference is equal to or greater than the allowable difference threshold. Accordingly, it is possible to suppress a decrease in accuracy of path planning due to correction using the recognition result of the lane lines.

Although embodiments of the present disclosure have been described above, the present disclosure is not limited to the above-described embodiments. The present disclosure can be implemented in various forms in which various changes and modifications are made based on the knowledge of those skilled in the art, including the above-described embodiments.

The path planning apparatus 100 does not necessarily require the use of the radar sensor 2, the GNSS receiver 3, and the map database 4. The path planning apparatus 100 may be operated in a mode in which path generation and correction are performed using only the captured image of the vehicle-mounted camera 1.

What is claimed is:

1. A path planning apparatus for generating a path plan of a host vehicle from an image captured by a vehicle-mounted camera using a first deep learning model, recognizing left and right lane lines forming a travelling lane of the host vehicle from the image captured by the vehicle-mounted camera, and correcting the path plan using a recognition result of the lane lines, the path planning apparatus comprising:

a processor configured to:

in response to a distance in a lane width direction between a path of the vehicle in the path plan and a center position between the left and right lanes being equal to or greater than a predetermined distance, perform the correction so that the path of the vehicle approaches the center position;

determine whether the left and right lane lines satisfy a preset parallel condition;

not correct the path plan using the recognition result of the lane lines, in response to the left and right lane lines being determined as not satisfying the parallel condition, regardless of the distance between the path of the vehicle and the center position; and control autonomous driving of the host vehicle in accordance with the path plan.

2. The path planning apparatus of claim 1, wherein the left and right lane lines are recognized using a second deep learning model from the image captured by the vehicle-mounted camera, and the second deep learning model is different from the first deep learning model.

3. The path planning apparatus of claim 2, wherein it is determined that the left and right lane lines do not satisfy the parallel condition when an angle formed by the left and right lane lines is greater than or equal to an allowable angle threshold, when the travelling lane is a straight line.

4. The path planning apparatus of claim 2, wherein a lane width of the travelling lane is calculated based on the recognition result of the lane lines whenever the recognition result of the lane lines is updated, a lane width difference that is a difference between the lane width before the update and the lane width after the update is calculated, and the left and right lane lines are determined as not satisfying the parallel condition when the lane width difference is greater than or equal to an allowable difference threshold.

5. The path planning apparatus of claim 1, wherein it is determined that the left and right lane lines do not satisfy the parallel condition when an angle formed by the left and right lane lines is greater than or equal to an allowable angle threshold, when the travelling lane is a straight line.

6. The path planning apparatus of claim 1, wherein a lane width of the travelling lane is calculated based on the recognition result of the lane lines whenever the recognition result of the lane lines is updated, a lane width difference that is a difference between the lane width before the update and the lane width after the update is calculated, and the left and right lane lines are determined as not satisfying the parallel condition when the lane width difference is greater than or equal to an allowable difference threshold.

7. A path plan correction method of a path planning apparatus, the method comprising:

generating a path plan of a host vehicle from an image captured by a vehicle-mounted camera using a first deep learning model;

recognizing left and right lane lines forming a travelling lane of the host vehicle from the image captured by the vehicle-mounted camera;

correcting the path plan using a recognition result of the lane lines;

in response to a distance in a lane width direction between a path of the vehicle in the path plan and a center position between the left and right lanes being equal to or greater than a predetermined distance, performing the correction so that the path of the vehicle approaches the center position;

determining whether the left and right lane lines satisfy a preset parallel condition; and not correcting the path plan using the recognition result of the lane lines, in response to the left and right lane lines being determined as not satisfying the parallel condition, regardless of the distance between the path of the vehicle and the center position; and controlling autonomous driving of the host vehicle in accordance with the path plan.

* * * * *